Nov. 5, 1957     N. C. RELLIS     2,812,039
BRAKING AND STEERING ATTACHMENT FOR SLEDS
Filed Feb. 8, 1955
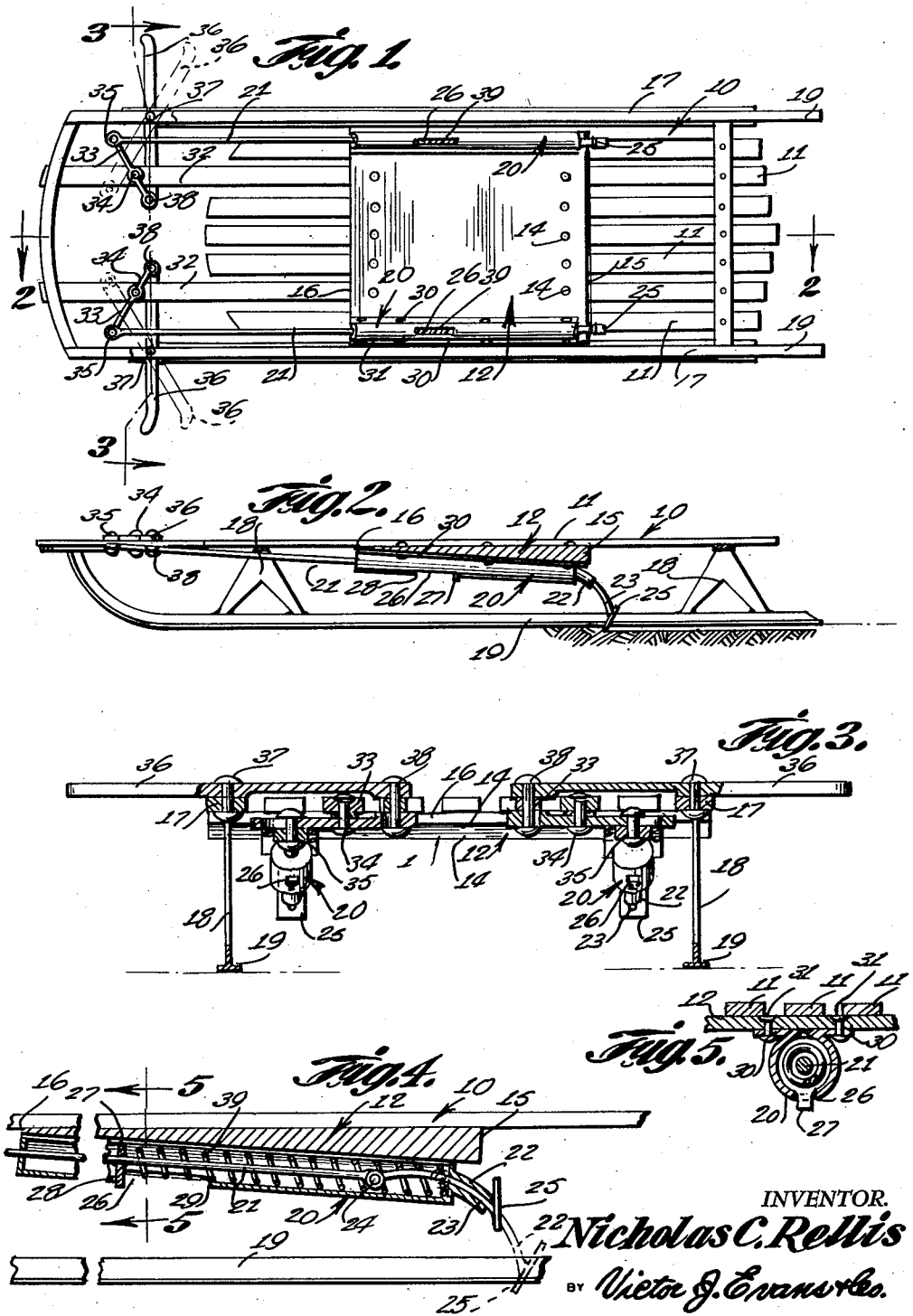
INVENTOR.
Nicholas C. Rellis
BY Victor J. Evans & Co.
ATTORNEYS

United States Patent Office 2,812,039
Patented Nov. 5, 1957

2,812,039

BRAKING AND STEERING ATTACHMENT FOR SLEDS

Nicholas C. Rellis, Reading, Pa.

Application February 8, 1955, Serial No. 486,837

3 Claims. (Cl. 188—8)

This invention relates to a sled, and more particularly to a braking and steering attachment for sleds.

The object of the invention is to provide a manually operable mechanism which can be used to effectively arrest the forward movement of a sled wherein the sled can be readily steered by the present invention.

Another object of the invention is to provide a sled steering and braking mechanism which includes a pair of brake plates or shoes that can be operated independently so that they can be moved into and out of engagement with the snow or ice to stop the forward movement of the sled or to turn the sled as desired, the brake plates being normally urged or biased out of engagement with the snow by means of coil springs.

A further object of the invention is to provide a sled braking and steering mechanism which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a bottom plan view of the sled equipped with the brake and steering mechanism of the present invention.

Figure 2 is a sectional view taken on the line 2—2 of Figure 1.

Figure 3 is a sectional view taken on the line 3—3 of Figure 1.

Figure 4 is a fragmentary sectional view illustrating the springs in one of the casings.

Figure 5 is a sectional view taken on the line 5—5 of Figure 4.

Referring in detail to the drawings, the numeral 10 designates the platform of the sled and the platform 10 may include a plurality of spaced parallel slats or boards 11. Arranged intermediate the ends of the sled is a wedge shaped base 12 which can be made of any suitable material, and as shown in Figures 2 and 4 the rear end 15 of the base 12 is of greater thickness than the front end 16, for a purpose to be later described. The base 12 may be secured to the slats of the platform 10 by suitable securing elements such as bolts 14.

The sled further includes a pair of spaced parallel side members 17 which have braces 18 depending therefrom, and the usual runners 19 are secured to the braces 18.

Arranged contiguous to the lower surface of the base 12 is a pair of hollow tubes or casings 20 and since the base 12 has the wedge shaped formation as shown in Figure 4, the casings 20 will be inclined so that the front ends thereof are higher than the rear ends thereof. Reciprocally mounted in each of the casings 20 is a rod 21, and depending from the end of each of the casings 20 is a sleeve 22 which may have an arcuate formation. A curved arm 23 is slidably mounted in each sleeve 22, and a pivot pin 24 pivotally connects each arm 23 to the corresponding rod 21. A brake shoe or plate 25 is secured to the rear end of the arm 23, and the brake shoe 25 is mounted for movement into and out of engagement with the ice or snow as shown in Figure 2.

The undersurface of each of the casings 20 is provided with a cutout 26 which defines a pair of stop shoulders 28 and 29. A lug 27 is secured to each of the rods 21, and the lug 27 projects through the cutout 26 and is adapted to abut the shoulder 28 or 29 to limit reciprocatory movement of the rod 21. For securing the pair of casings 20 to the base 12, each casing is provided with a pair of flat flanges 30 which are arranged contiguous to the undersurface of the base, Figure 5. Suitable securing elements such as bolt and nut assemblies 31 serve to connect the flanges 30 to the base.

There is further provided a pair of links 33 which are pivotally connected to elongated slats 32 by means of pivot pins 34, Figure 1. A pivot pin 35 pivotally connects the link 33 to the adjacent rod 21 and there is also provided a pair of handle members or levers 36 which are adapted to be manually gripped and actuated. The levers 36 are pivotally connected to the front of the sled by pivot pins 37, and a pivot pin 38 serves to connect a lever 36 to a corresponding link 33. Thus, it will be seen that there are two of the levers 36, one for each of the brake shoes 25 so that the brake shoes 25 can be operated either together or in unison. Thus, the pair of brake shoes 25 can be simultaneously lowered by manually pivoting the levers 36, or else only one of the brake shoes 25 can be lowered as when turning of the sled is to be effected. A coil spring 39 is positioned in each casing 20, and one end of the coil spring 39 abuts the lug 27 while the other end of the coil spring abuts the rear end wall of the casing, the coil spring serving to normally bias the rod 21 forwardly and the brake shoe 25 up out of engagement with the snow.

From the foregoing it is apparent that there has been provided a braking and steering mechanism which can be readily attached to a sleigh or sled. In use the parts can be mounted on sleigh as shown in the drawings and then the user can merely grip and pivot the levers 36 about the pins 37. Pivotal movement of the levers 36 causes swinging movement of the links 33 and this in turn causes reciprocation of the rods 21. As the rod 21 moves rearwardly the lug 27 compresses the spring 39 and moves the brake shoe 25 down into engagement with the snow or ice. If both brake shoes are simultaneously moved into engagement with the ice the sled's forward motion will be stopped or arrested. If only one of the brake shoes is moved into engagement with the snow or ice then the sled can be guided or turned as desired. When pressure on the levers 36 is released the coil springs 39 will return the parts to their normal position and raise the brake shoes 25 so that there will be no interference with normal use of the sled. Since the brake shoes 25 are moved in a raised position by means of the coil springs, there will be no danger that the brake shoes will catch on protruding objects or hurt anybody in the event that the sled accidentally runs over a person. Furthermore, the parts can be readily attached to a conventional sled without requiring any material alteration of the sled and since the base 12 has a wedge shape, the tubes or casings 20 will be inclined as shown in Figures 2 and 4 so that the brake shoes will be guided downwardly when the levers 36 are actuated.

I claim:

1. In a sled, a platform including a plurality of spaced parallel slats, braces depending from said platform, a pair of runners secured to said braces, a wedge shaped base positioned beneath said platform and secured thereto, the rear of said base being thicker than the front thereof, a pair of spaced parallel hollow inclined casings positioned below said base and having flanges secured to said base, there being a cutout in the lower surface of each of said casings defining a pair of stop shoulders, a rod reciprocally mounted in each of said casings, a lug secured to each rod and projecting through said cutout and adapted to engage said stop shoulders, a curved sleeve depending from the rear of each of said casings, an arm slidably mounted in each of said sleeves and pivotally connected to said rods, a brake plate secured to the rear end of each of said arms, resilient means for normally urging said brake plates to their raised position, a pair of links pivotally connected to the front of said platform and said links being pivotally connected to the front ends of said rods, and a pair of manually operable levers pivotally connected to said platform and pivotally connected to said links.

2. The structure as defined in claim 1, wherein said resilient means comprises coil springs positioned in said casings and circumposed on said rods and abutting said lugs.

3. In a sled, a platform including a plurality of slats, braces depending from said platform, a pair of runners secured to said braces, a base positioned beneath said platform and secured thereto, the rear of said base being thicker than the front thereof, a pair of inclined casings positioned below said base and having flanges secured to said base, there being a cutout in each of said casings defining a pair of stop shoulders, a rod reciprocally mounted in each of said casings, a lug secured to each rod and projecting through said cutout and adapted to engage said stop shoulders, a sleeve depending from each of said casings, an arm slidably mounted in each of said sleeves and pivotally connected to said rods, a brake plate secured to each of said arms, resilient means for normally urging said brake plates to their raised position, a pair of links pivotally connected to said platform and said links being pivotally connected to said rods, and a pair of manually operable levers pivotally connected to said platform and pivotally connected to said links.

References Cited in the file of this patent

UNITED STATES PATENTS

| 1,614,137 | Limbers | Jan. 11, 1927 |

FOREIGN PATENTS

| 181,433 | Germany | Feb. 19, 1907 |
| 114,087 | Sweden | May 22, 1945 |